F. W. ADAMS.
JOINT FOR METAL BEDS.
APPLICATION FILED FEB. 23, 1909.
945,736.
Patented Jan. 11, 1910.
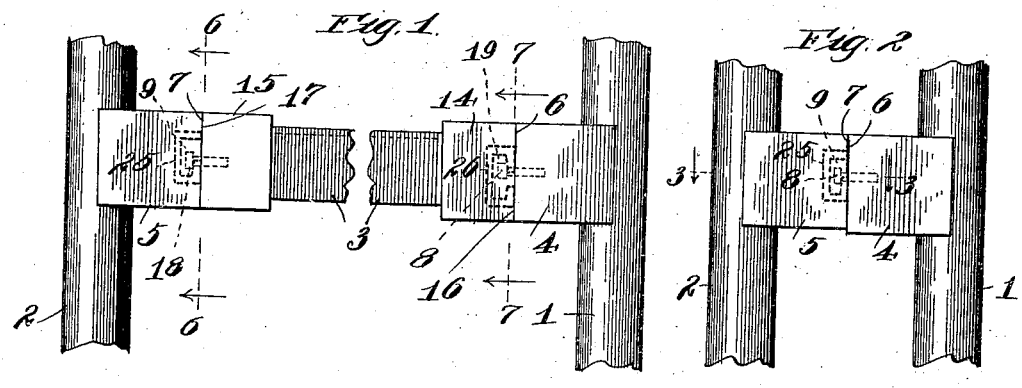
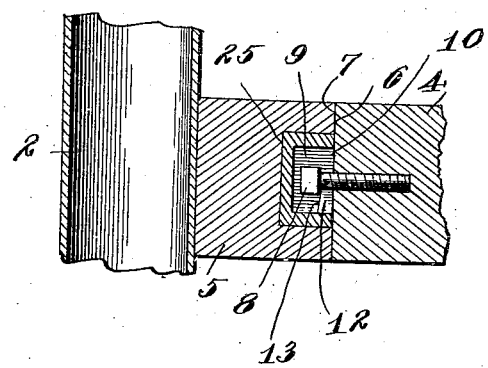
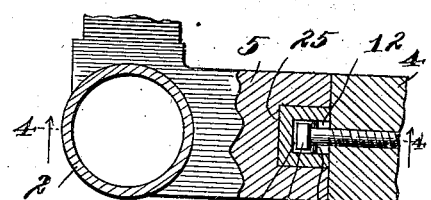
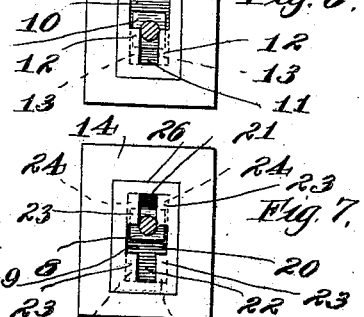
Witnesses:
G. A. Pauberschmidt
K. A. Costello
Inventor:
Francis W. Adams,
By Geo. E. Waldo,
Atty

UNITED STATES PATENT OFFICE.

FRANCIS W. ADAMS, OF CHICAGO, ILLINOIS.

JOINT FOR METAL BEDS.

945,736.  Specification of Letters Patent.  Patented Jan. 11, 1910.

Application filed February 23, 1909. Serial No. 479,329.

*To all whom it may concern:*

Be it known that I, FRANCIS W. ADAMS, a citizen of the United States, and a resident of Chicago, Cook county, Illinois, have invented certain new and useful Improvements in Joints for Metal Beds, of which the following is a specification.

This invention relates to joints for connecting members of metal bedsteads, as the side rails to the posts thereof.

The object of the invention is to provide a joint, particularly designed and adapted for connecting the side rails to the posts of a metal bedstead, so constructed and arranged that the head and foot of the bedstead shall be provided, one with male and the other with corresponding female joint-members, together forming a complete joint, whereby the head and foot of a bedstead provided with my improved joints, may be connected and set up in show and sales rooms for display and exhibition purposes without the use of short rails or other means now used for this purpose.

A further object of the invention is to provide joints comprising male and female joint-members on the head and foot of the bedstead and on the ends of the side rails so constructed and arranged that the side rails may be reversed to adapt the bed for use either with or without slats, as may be desired.

To effect these objects, a joint of my invention comprises the various features and details of construction hereinafter described and claimed.

In the accompanying drawing, in which my invention is fully illustrated,—Figure 1 is a partial side view of a bedstead, as set up for use, showing the head, foot and side rails connected by my improved joints. Fig. 2 is a view similar to Fig. 1, showing the head and foot of the bedstead connected directly to each other by means of my improved joints, as set up for exhibition or display purposes. Fig. 3 is a plan section on the line 3—3 of Fig. 2, on an enlarged scale. Fig. 4 is a sectional elevation on the line 4—4 of Fig. 3, also on an enlarged scale. Fig. 5 is a view similar to Fig. 4 of the joint other than that shown in said Fig. 4; and Figs. 6 and 7 are enlarged plan sections on the lines 6—6 and 7—7, respectively, of Fig. 1.

Referring now to the drawing, 1 and 2 are posts, one of the head and the other of the foot of a bedstead, respectively, and 3 a side rail for connecting said posts.

Cast upon the posts 1 and 2, respectively, are joint-members 4 and 5, said joint-members 4 and 5 being provided with surfaces 6 and 7 adapted to abut against each other when the bedstead is set up for display purposes, or against corresponding surfaces on joint-members on the ends of the side rail 3, when said bedstead is set up for use. Projecting from the end of one of said joint-members, as shown from the member 4, is a key or headed stud 8, which is adapted to engage a corresponding key socket 9 in the abutting face 7 of the joint-member 5 on the post 2. The key opening for the socket 9 comprises a section 10 adapted to receive the head of the key or stud 8 and a reduced section 11 extending downwardly from the lower edge of said section 10, said reduced section being narrower than the head of the key or stud 8, but sufficiently wide to receive the shank of said key or stud. The reduced portion 11 of the socket 9 is formed by flanges 12 which extend inwardly over the open side of the recess 9, the inner edges 13 of said flanges being inclined inwardly away from the lower edge of the enlarged section 10 of said key opening, thus forming cam surfaces, engagement of which by the head of the key or stud 8 will operate to draw the joint-members 4 and 5 together so that the surfaces 6 and 7 thereon will abut against each other. The joint-members 4 and 5, the key or stud 8, and the socket 9 are preferably so proportioned and positioned that, when the key or stud 8 is in full engagement with the key socket 9 with the faces 6 and 7 abutting, the top and lateral sides of the joint-members 4 and 5 will register with each other. For reasons presently apparent, however, the vertical dimension of the joint-member 4, with the construction shown, is somewhat greater than the vertical dimension of the joint-member 5.

With the described construction, it is obvious that by engaging the key or stud 8 with the socket 9, the head and foot of the bedstead can be rigidly connected and set up for display and exhibition purposes without the use of the short rails or other means commonly used for this purpose, thus eliminating said rails, in the manner desired.

To provide for setting the bedstead up for use, the side rail 3 is provided on its opposite ends with joint-members 14 and 15, consisting, as shown, of suitable heads cast directly upon the ends of said side rail, the end surfaces 16 and 17 of which, respectively, are adapted to abut against the corresponding surfaces 6 and 7 of the joint members 4 and 5 when the bed is set up for use. Projecting from the end of the joint member 15 is a key or headed stud 18, the same being substantially a duplicate of the stud 8 on the joint-member 4 and being adapted to engage the key socket 9 in the joint-member 5 in the same manner as said key or stud 8 engages said socket. Formed in the joint-member 14 is a key socket 19 adapted for engagement with the key or stud 8 projecting from the joint member 4. The socket 19 may be a substantial duplicate of the socket 9 in the joint-member 5, with the exception, however, that the narrow section of the key opening of said socket shall extend upwardly from the enlarged section thereof through which the head of the key or stud passes into engagement with said key socket instead of below the same, as in the key socket 9.

In the preferable construction shown, and to provide for reversing the side rail 3, the socket 19 is preferably made double, comprising a central enlarged section 20 adapted to permit the head of the key or stud 8 to pass through the same into engagement with said socket and relatively narrow portions 21 and 22 arranged symmetrically above and below said enlarged section 20, said relatively narrow sections being narrower than the head of said key or stud 8 but sufficiently wide to receive the shank thereof. As in the case of the socket 9, both reduced sections 21 and 22 of the key socket 19 are formed by flanges 23 which extend inwardly over the open side of said socket, the inner surfaces of which are inclined, as shown at 24, to form cam surfaces corresponding to the cam surfaces 13 of the key socket 9. The key socket 19 is disposed centrally with reference to the side rail 3, and the joint-members 4 and 14 are so proportioned and arranged that the abutting ends thereof will register with each other when connected in either position.

In order to reverse the side rails 3 with the construction described, it is obvious that it will be necessary to transfer them from one side to the other of the bed.

The studs or keys 8 and 18 may either be formed integral with the joint members to which they are respectively secured, or may consist of a separate stud cast into said joint members.

To prevent the side rails from turning, the joint members on said side rails and on the posts are preferably provided with interlocking parts adapted to prevent turning thereof. As shown, this is effected by forming the sides of the heads and shanks of the keys or studs 8 and 18 flat and of sufficient length to prevent turning thereof in the sockets 9 and 19.

For convenience of manufacture, the key sockets 9 and 19 are preferably formed in separate malleable inserts 25 and 26, respectively, cast into the abutting faces of the joint members 5 and 14, respectively. Said key sockets 9 and 19 may extend entirely through said inserts 25 and 26, but to prevent the metal which forms the joint-members 5 and 14 from flowing into said key sockets, the rear sides thereof are preferably closed, as by plates preferably formed integral with the sides of said inserts. Thus, by placing the inserts 25 and 26 within the molds with the open sides of said key sockets 9 and 19 in contact with sides of the molds, the molten metal for forming said joint-members 5 and 14 will be effectually prevented from entering and obstructing said key sockets.

I claim:—

1. Joints for connecting the head and foot of a bedstead comprising male joint-members on one thereof, and female joint-members on the other adapted for engagement with each other, and corresponding male and female joint-members on opposite ends of the side rails, whereby said head and foot are adapted to be set up both with and without said side rails, substantially as described.

2. Joints for connecting the head and foot of a bedstead comprising male joint-members on one thereof and female joint-members on the other adapted for engagement with each other, a corresponding male joint-member on one end of each side rail and double female joint-members on the opposite ends thereof, whereby said head and foot may be set up both with and without the side rails and said side rails may be reversed, substantially as described.

3. Joints for connecting the head and foot of a bedstead comprising joint-members thereon and on opposite ends of the side rails, said joint-members being provided with surfaces designed and adapted to abut against one another when the bedstead is set up, keys which project from the abutting surfaces of the joint-members on one bedstead member and on one end of each side rail, and the joint-members on the other bedstead member and on the opposite ends of said side rails being provided with key sockets in their abutting surfaces adapted for engagement by said keys, whereby said head and foot are adapted to be set up both with and without said side rails, substantially as described.

4. Joints for connecting the head and foot of a bedstead comprising joint-members thereon and on opposite ends of the side rails, said joint-members being provided with surfaces designed and adapted to abut against one another when the bedstead is set up, keys which project from the abutting surfaces of the joint-members on one bedstead member and on one end of each side rail, and the joint-members on the other bedstead member and on the opposite end of said side rail being provided with key sockets in their abutting surfaces adapted for engagement by said keys, whereby said head and foot are adapted to be set up both with and without said side rails, the key sockets in said side rail joint-members being double, whereby said side rails may be reversed, substantially as described.

In testimony, that I claim the foregoing as my invention, I affix my signature in presence of two subscribing witnesses, this 17th day of February, 1909.

FRANCIS W. ADAMS.

Witnesses:
K. A. COSTELLO,
E. L. NICHOLSON.